(12) United States Patent
Haverdink

(10) Patent No.: US 6,907,718 B2
(45) Date of Patent: Jun. 21, 2005

(54) COTTON HARVESTER ROW UNIT AIR SWEEP

(75) Inventor: Virgil Dean Haverdink, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/644,317

(22) Filed: Aug. 20, 2003

(65) Prior Publication Data

US 2005/0039429 A1 Feb. 24, 2005

(51) Int. Cl.$^7$ .............................................. A01D 46/10
(52) U.S. Cl. ........................................... 56/13.1; 56/32
(58) Field of Search .............................. 56/30–32, 28, 56/12.9, 13.1

(56) References Cited

U.S. PATENT DOCUMENTS

| | | | |
|---|---|---|---|
| 4,271,659 A | 6/1981 | McConnell | 56/13.3 |
| 4,501,112 A * | 2/1985 | Thedford et al. | 56/13.3 |
| 4,660,359 A | 4/1987 | Deutsch | 56/13.3 |
| 4,821,497 A | 4/1989 | Deutsch et al. | 56/41 |
| 4,928,459 A | 5/1990 | Thedford et al. | 56/13.3 |
| 5,355,663 A | 10/1994 | Deutsch et al. | 56/12.1 |
| 5,519,988 A * | 5/1996 | Copley et al. | 56/30 |

* cited by examiner

Primary Examiner—Meredith C. Petravick

(57) ABSTRACT

A cotton harvester row unit having discharge door structure includes first and second high pressure air outlets offset in the fore-and-aft direction from each other. A first vertical tube is connected to an upper air supply conduit and extends downwardly and opens rearwardly near the front of the unit to direct air towards the door structure outlet. A second vertical tube which extends downwardly near the rear of the unit and opens towards the outlet is connected to the air supply conduit to direct a sweeping blast of air towards the outlet near the floor of the door structure where plugging is a problem.

20 Claims, 3 Drawing Sheets

COTTON HARVESTER ROW UNIT AIR SWEEP

FIELD OF THE INVENTION

The present invention relates generally to cotton harvesters and, more specifically, to air systems for handling cotton.

BACKGROUND OF THE INVENTION

Jet post assemblies such as shown in U.S. Pat. No. 4,660,359 provide both structural support and an air curtain over the floor panel structure of a cotton harvester row unit discharge compartment to increase the cotton-handling capacity of the compartment and prevent clogging in damp, high yield cotton. Air is bled from a nozzle located on the cotton conveying duct and channeled through upright structural posts connected to the floor panel structure. Lower outlets in the posts direct air over the floor panel structure. The air preserves the kinetic energy of the doffed cotton and positively directs cotton to the discharge opening.

Recent cotton harvesters such as exemplified in U.S. Pat. Nos. 4,821,947 and 5,519,988 include inline drum units wherein cotton removed from plants by spindles on the drums is directed rearwardly in door structure extending rearwardly alongside the drums. The existing front air jet post structure provides a curtain of air which helps propel the cotton rearwardly. In adverse conditions, such as in high yielding cotton or in damp cotton, plugging is still a common problem because the air stream near the rear drum is insufficient to keep the cotton moving over the floor of the door structure. Providing improved cotton flow without requiring significant additional fan output and without adversely cluttering the narrow area above the row unit has heretofore been a continuing source of problems.

SUMMARY OF THE INVENTION

It is therefore an object of the present invention to provide an improved air system for a cotton harvester. It is a further object to provide such a system which overcomes most or all of the above-mentioned problems.

It is another object to provide an improved air system for a cotton harvester which is particularly useful with a dual inline drum row unit for preventing blockages in wet or high yield cotton conditions.

A cotton harvester row unit having cotton discharge structure includes first and second high pressure air outlets offset in the fore-and-aft direction from each other. A first vertical tube is connected to an air supply conduit and extends downwardly and opens rearwardly near the front of the unit to direct air towards the discharge structure outlet. A second vertical tube which extends downwardly near the rear of the unit and opens towards the outlet is connected to the air supply conduit to direct a sweeping blast of air towards the outlet near the floor of the door structure where plugging is a problem. The added air blast from the second tube sweeps the floor clean near the outlet to keep material flowing into the suction door and prevent plugging. The vertical tubes can be part of the structural framework of the row unit to maintain unit compactness.

These and other objects, features and advantages of the present invention will become apparent from the following description taken with the drawings.

DESCRIPTION OF THE PREFERRED EMBODIMENT

Figure 1:
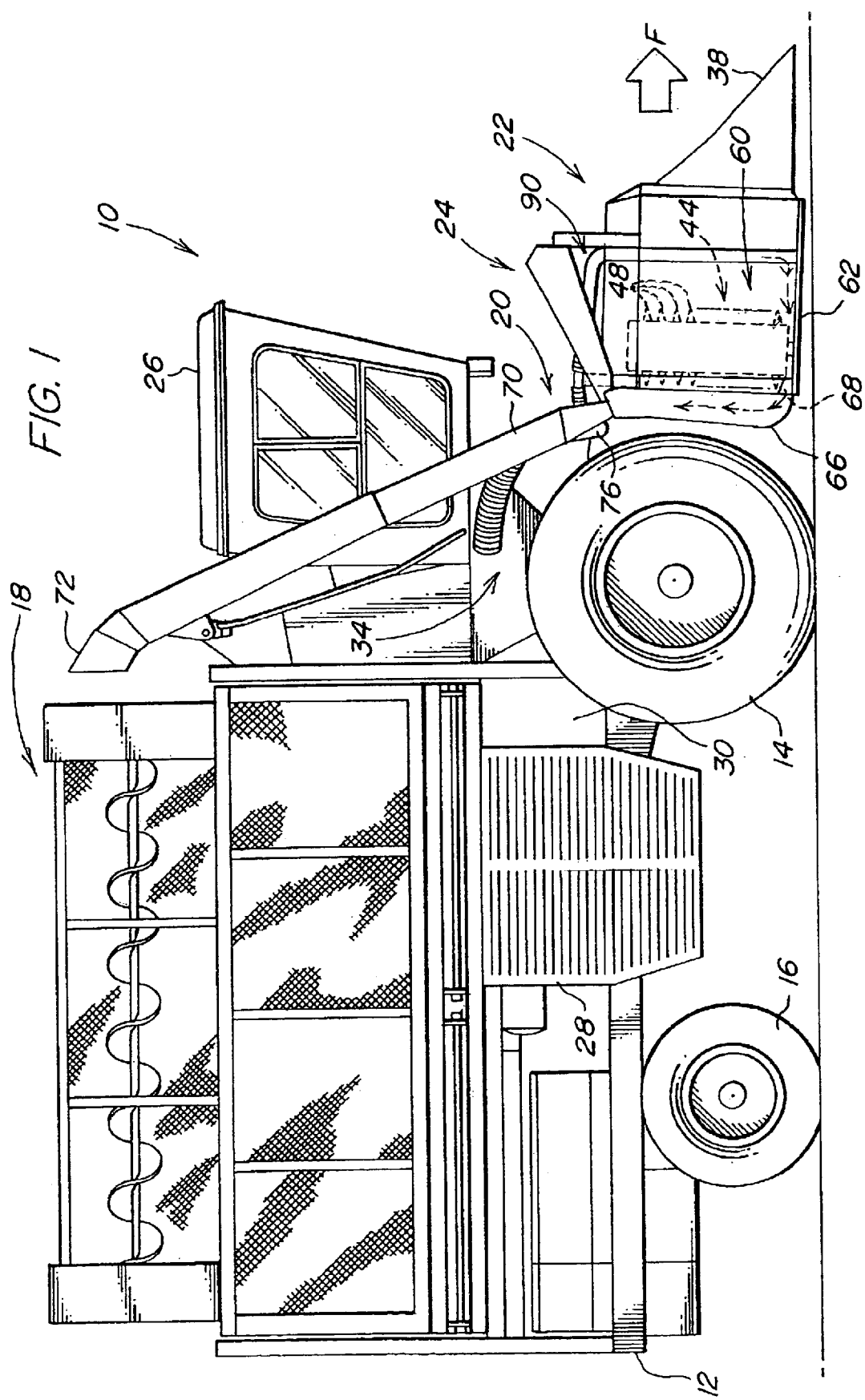
FIG. 1 is a side view of a cotton harvester with air sweep structure attached thereto.

Referring now to FIG. 1, therein is shown a cotton harvester 10 generally of conventional construction and having a main frame 12 supported for forward movement over the ground by forward drive wheels 14 and rear steerable wheels 16. A cotton receptacle 18 is supported on the frame 12 for receiving cotton through an air duct conveying system indicated generally at 20. A plurality of row harvesting units 22 are transversely and adjustably spaced on vertically moveable unit support structure 24 located at the forward end of the frame 12 below an operator cab 26. An engine at location 28 powers the drive wheels 14 and fan structure 30 for supplying air to the conveying system 20 through plenum and air conduit structure 34.

Figure 3:
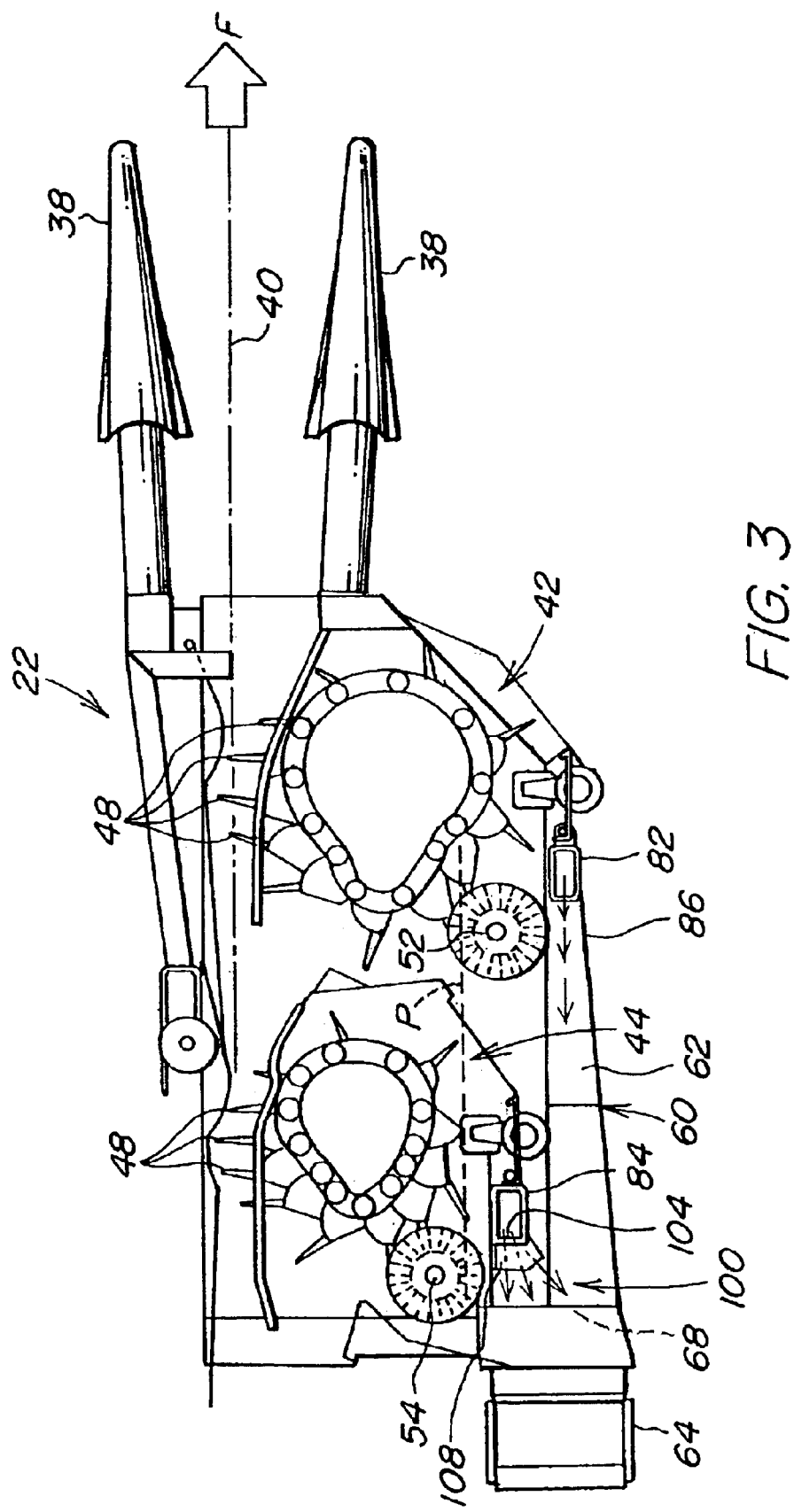
FIG. 3 is a top view of the row unit from the harvester of FIG. 1.

Each of the row units 22 includes forward plant guide and stalk lifting members 38 directing cotton plants into a row-receiving area indicated at 40 in FIG. 3. Upright harvesting drum structures 42 and 44 located on one side of the row-receiving area 40 include rows of spindles 48 for removing cotton from cotton plants entering the row-receiving area 40. The removed cotton is doffed from the spindles 48 by upright doffers 52 and 54 supported for rotation about upright axes located on the side of the drum axes opposite the row-receiving area. The doffers 52 and 54 direct the cotton outwardly and rearwardly into upright door structure 60 having a floor 62 located on the side of the row unit 22 opposite the row-receiving area 40. The door structure 60 extends from a forward location outwardly adjacent the forward doffer 52 rearwardly and slightly outwardly to a location rearwardly adjacent the doffer 54. A suction door 64 is supported at the aft end of the row unit 22 rearwardly and outwardly from the aft doffer 54. A lower suction door opening 68 is located just above the floor 62 between the structure 60 and suction door 64.

The suction door 62 extends upwardly to an outlet end connected to the lower end of a telescoping duct 70. The duct 70 extends upwardly and rearwardly from the row unit 22 to a discharge end 72 which opens into the basket 18. A nozzle 76 connected to the plenum and conduit structure 34 opens upwardly into the lower end of the duct 70. Air directed upwardly from the nozzle 76 induces a vacuum in the suction door 66 and draws cotton rearwardly through the opening 68 and upwardly into the lower end of the duct 70. The cotton is then propelled upwardly through the duct 70 and into the basket 18 by the upwardly directed air from the nozzle 76.

The row unit 22 includes a row unit frame having forward and rearward upright tubular members 82 and 84 located forwardly adjacent the doffers 52 and 54. A fore-and-aft extending upright plane (see P of FIG. 3) will intersect both doffers 52 and 54, and the members 82 and 84 are located outwardly of the plane P. The door structure 60 includes an outer upright panel 86 extending upwardly from the floor 62 and rearwardly from the forward tubular member 82. The panel 86 extends outwardly at a location forward of the member 84 to the outermost extremity of the suction opening 68. The cross sectional area of the forward member 82 as shown is larger than the cross sectional area of the member 84. For example, the forward member may be a 2×4 tubing and the member 84 may be a 1.5×3 tubing. The member 82 has an upper end opening into a source of assisting air 90 and a lower end with an outlet 92 opening rearwardly to direct a flow of air over the floor 62 towards the suction door 66 to help propel cotton doffed by the doffer 52 rearwardly towards the suction opening 68.

To help prevent blockages at the rear of the door structure 60 adjacent the suction opening in high yield, damp or sticky conditions, a sweep of air indicated generally at 100 is provided over the floor 62 near the outlet end of the door structure. The lower end of the member 84 includes a rearwardly directed outlet 104. The upper end of the member 84 is connected to the source of assisting air 90. A deflector plate 106 may be connected to the member 84 directly above the outlet 104 to help direct the air more effectively over the floor towards the opening 68. Cotton removed by the forward drum structure 42 is doffed outwardly and rearwardly by the doffer 52. The curtain of air directed over the floor 62 by the outlet 92 helps maintain the momentum of the forward drum cotton. Additional cotton removed by the aft drum structure 44 is doffed outwardly and rearwardly by the doffer 54 and joins the cotton from the forward drum. The additional sweep of air 100 provided by the outlet 104 helps preserve the kinetic energy of the cotton from both the drum structures so that plugging adjacent the suction opening 68 is reduced or eliminated.

Figure 2:
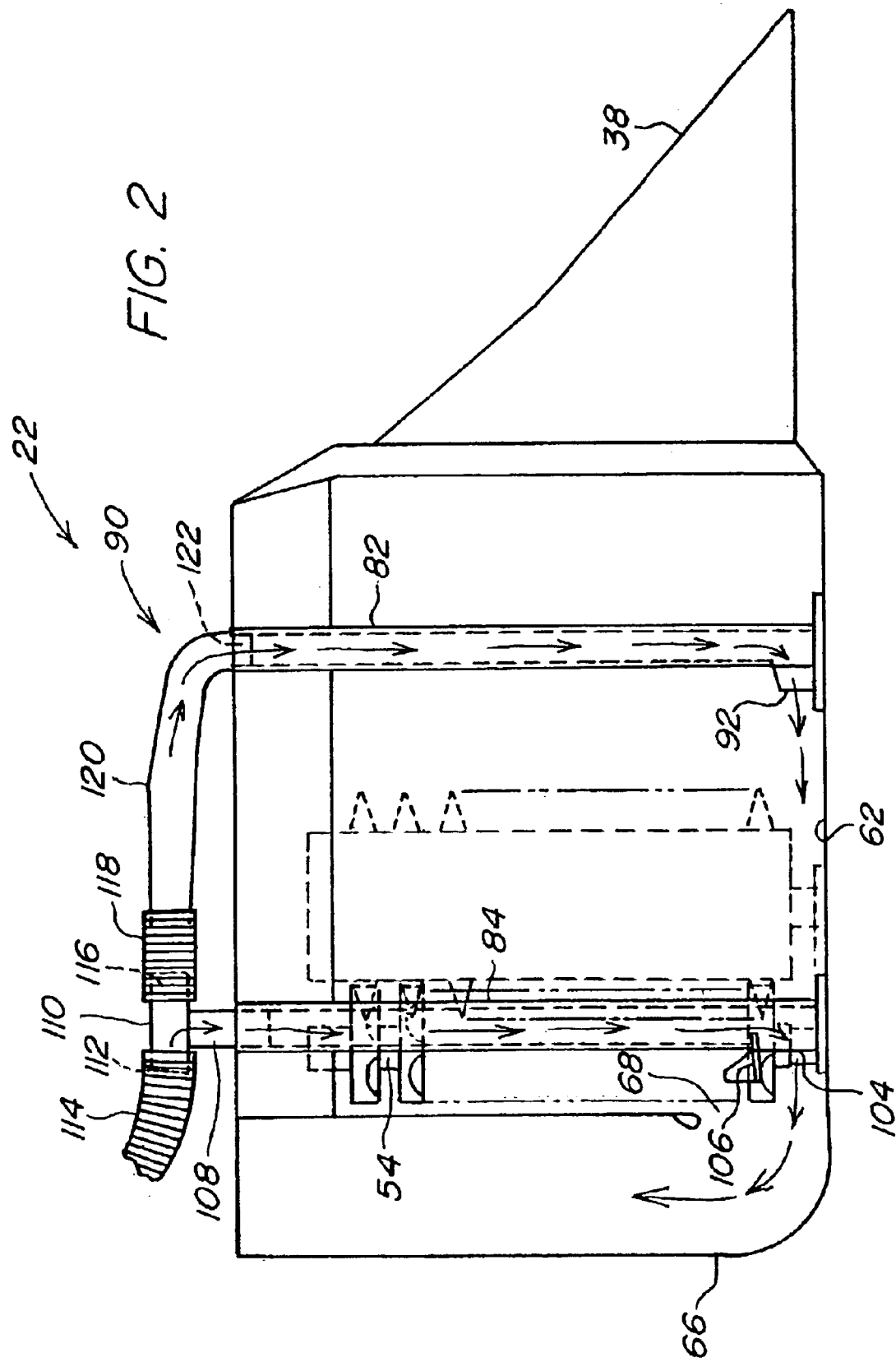
FIG. 2 is an enlarged schematic view of a row unit from the cotton harvester of FIG. 1 showing the air sweep structure.

As shown in FIG. 2, the upper end of the tubular member 84 is connected by a downwardly directed leg 108 of a T-connector 110. The T-connector includes a horizontally disposed inlet 112 which extends at a right angle to the leg 108 and is connected to a forwardly directed flexible tubing 114 from the air conduit structure 34. The flexible tubing 114 is connected to an outlet on the nozzle 76 or, alternatively, directly to the fan plenum. A horizontally disposed outlet 116 axially aligned with the inlet 112 is connected through a tubing section 118 to a forward inlet member 120 which may be fabricated from a plastic material. The inlet member 120 has a down-turned end 122 connected to the top of the member 82. The connector 110 provides a direct air path from the tubing 114 to the inlet member 120 for the larger member 82 and yields a higher volume blast of air from the outlet 92 compared to the air sweep 100. The generally fore-and-aft extending air feed arrangement described above is compact and does not interfere with other components on the unit 22.

Having described the preferred embodiment, it will become apparent that various modifications can be made without departing from the scope of the invention as defined in the accompanying claims.

I claim:

1. A conveying structure for a cotton harvester row unit having an upright fore-and-aft extending cotton receiving structure with opposite ends, a floor structure, and a material discharge opening adjacent one of the ends opening into an area of reduced air pressure for removing cotton from the row unit, the structure comprising first and second fore-and-aft spaced upright tubes each having a lower air outlet opening adjacent the floor towards the discharge opening; and a source of air under pressure connected to the upright tubes for providing flow of air through the outlets generally horizontally towards the opening, the flow of air from the air outlet of the first tube moving cotton from a forward area of the row unit towards the discharge opening and the flow of air from the outlet of the second tube sweeping the floor near the outlet to thereby prevent plugging near the outlet.

2. The conveying structure set forth in claim 1 wherein the upright tubes comprise row unit frame members.

3. The conveying structure set forth in claim 1 wherein the source of air under pressure includes a fore-and-aft extending air feed structure extending above the row unit and connected to upper ends of the upright tubes.

4. The conveying structure set forth in claim 1 wherein the second upright tube is offset inwardly from the first upright tube and the outlet of the second upright tube is aligned with one side of the material discharge opening.

5. The conveying structure set forth in claim 4 wherein the outlet of the second upright tube opens rearwardly and outwardly towards the material discharge opening.

6. A conveying structure for a cotton harvester row unit having an upright fore-and-aft extending cotton receiving structure with opposite ends, a floor structure, and a material discharge opening adjacent one of the ends opening into an area of reduced air pressure for removing cotton from the row unit, the structure comprising first and second fore-and-aft spaced upright tubes having lower air outlets opening towards the discharge opening;

a source of air under pressure connected to the upright tubes for providing flow of air through the outlets towards the opening, the flow of air from the air outlet of the first tube moving cotton from a forward area of the row unit towards the discharge opening and the flow of air from the outlet of the second tube sweeping the floor near the outlet to thereby prevent plugging near the outlet; and further including upright front and rear doffers directing cotton into the cotton receiving structure, and wherein the first and second upright tubes are located adjacent the front and rear doffers, respectively.

7. The conveying structure as set forth in claim 6 wherein the front and rear doffers intersect a fore-and-aft extending upright plane.

8. The conveying structure set forth in claim 7 wherein the lower air outlets are located adjacent lower ends of the doffers.

9. A conveying structure for a cotton harvester row unit adapted for movement in a forward direction, the row unit having forward and aft ends, a row-receiving area, first and second fore-and-aft spaced upright harvesting drum structures located on one side only of the row-receiving area, an upright fore-and-aft extending cotton receiving structure with a floor structure located on the one side of the row-receiving area, and a suction opening adjacent one of the aft end, the conveying structure comprising first and second fore-and-aft spaced tubes having air outlets opening over the floor structure towards the suction opening;

air conduit structure connected to the tubes and providing air flow through the outlets towards the suction opening, the flow of air from the air outlet of the first tube moving cotton rearwardly towards the suction opening and the air flow from the outlet of the second tube sweeping the floor near the outlet to thereby prevent plugging near the outlet.

10. The conveying structure set forth in claim 9 wherein the tubes comprise row unit frame members.

11. The conveying structure set forth in claim 9 wherein the tubes are upright and the air conduit structure includes a fore-and-aft extending air conduit extending above the row unit and connected to upper ends of the upright tubes.

12. The conveying structure set forth in claim 9 further including upright front and rear doffers directing cotton into the cotton receiving structure, and wherein the first and second upright tubes are upright and are located adjacent the front and rear doffers, respectively.

13. The conveying structure as set forth in claim 12 wherein the front and rear doffers intersect a fore-and-aft extending upright plane.

14. The conveying structure set forth in claim 13 wherein the air outlets are located adjacent lower ends of the doffers.

15. The conveying structure set forth in claim 9 wherein the second upright tube is offset inwardly from the first upright tube and the outlet of the second upright tube is aligned with one side of the suction opening.

16. The conveying structure set forth in claim 15 wherein the outlet of the second tube opens rearwardly and outwardly towards the suction opening.

17. The conveying structure set forth in claim 9 wherein the air conduit structure includes a first conduit section extending forwardly from the aft end of the row unit, a connector connecting the first conduit section to the second tube, a second conduit section connected to and extending forwardly from the connector and connected to the first tube.

18. The conveying structure as set forth in claim 17 wherein the second conduit section extends in the fore-and-aft direction directly above a side of the row unit opposite the row-receiving area.

19. The conveying structure as set forth in claim 9 wherein the air outlets include a deflector structure for controlling air flow direction.

20. A conveying structure for a cotton harvester row unit adapted for movement in a forward direction, the row unit having forward and aft ends, a row-receiving area, fore-and-aft spaced upright harvesting drum structures defining a tandem drum arrangement located on one side only of the row-receiving area for removing cotton from a row of plants, an upright fore-and-aft extending cotton receiving structure with a floor structure located on the one side of the row-receiving area, and a suction opening adjacent the aft end, the conveying structure comprising:

means for directing a blast of air over the floor structure adjacent the forward drum structure towards the suction opening to propel cotton removed by the forward drum structure through the cotton receiving structure towards the suction opening; and means for directing an additional blast of air over the floor structure adjacent the aft drum structure towards the suction opening to help propel the cotton removed by the forward drum structure and the cotton removed by the aft drum structure through the suction opening.

\* \* \* \* \*